METHOD AND APPARATUS FOR PRODUCING SEMICONDUCTIVE STRUCTURES

Filed April 21, 1954

INVENTOR.
THOMAS V. SIKINA
BY
ATTORNEY

United States Patent Office 2,875,140
Patented Feb. 24, 1959

2,875,140

METHOD AND APPARATUS FOR PRODUCING SEMICONDUCTIVE STRUCTURES

Thomas V. Sikina, Philadelphia, Pa., assignor to Philco Corporation, Philadelphia, Pa., a corporation of Pennsylvania Application April 21, 1954, Serial No. 424,704

18 Claims. (Cl. 204—143)

The present invention relates to a method and apparatus for controlling the shape and especially the thickness of materials, and more particularly to the production of semiconductive bodies having controllably thin regions therein.

For both commercial and experimental purposes it is often desirable to produce bodies of materials having accurately controlled thicknesses, as for example in fabricating semiconductive circuit elements such as transistors. Particularly in fabricating transistors suitable for high frequency use, such as the surface-barrier transistor described in the copending application Serial No. 395,823 of Williams & Tiley, entitled "Electrical Device" and filed December 2, 1953, now abandoned, it is often desirable to provide a region in a semi-conductive body having a small but accurately controlled thickness. While for best high-frequency operation and best current gain this thickness should be relatively small, if the thickness is made too small the transistor may operate satisfactorily only at voltage levels below those which it is desired to utilize in normal operation. Furthermore, if the thickness is not very accurately controlled there is also the substantial possibility that complete perforation of the body will occur in many cases.

In the copending application Serial No. 395,756 of Tiley and Williams, entitled "Semiconductive Devices and Methods for the Fabrication Thereof" and filed December 2, 1953, now abandoned there is described a jet-etching process for producing such accurately-controlled thin regions in a body of semiconductive material by first jet-etching a pilot hole in the body while measuring the time required for perforation of the wafer, and then etching another depression adjacent the pilot hole for a time slightly less than that determined to be necessary for perforation. While such methods are suitable in many applications, nevertheless their accuracy is limited by the requirements that the opposing wafer surfaces be precisely parallel and that conditions such as the compositions of the germanium material and of the etching solution, and the magnitudes of the etching currents and the illumination be substantially the same during the two successive etching operations.

Accordingly, it is an object of my invention to provide an improved method and apparatus for producing semiconductive bodies of material of predetermined thicknesses.

Another object is to provide such a method and apparatus which are reliable and simple.

A further object is to provide an improved method and apparatus for deriving indications of the occurrence of a predetermined thickness in a semiconductive material of variable thickness.

Still another object is to provide an improved method and apparatus for producing semiconductive structures suitable for use in transistor or diode devices.

In accordance with the invention, the above objects are achieved by progresively modifying the thickness of the semiconductive body in the direction ultimately to provide the desired thickness and transmitting an electromagnetic radiation through the thickness dimension of the material, the radiation chosen containing spectral components with respect to which the material of the body possesses substantially different transmittances for at least some thicknesses produced during the process. The spectral distribution of the transmitted radiation has then been found to be a function of the thickness of the material, and the occurrence of a predetermined change in spectral distribution of the transmitted light is therefore utilized as an indication of the attainment of the desired thickness, at which time the above-described thickness-modifying step may be altered as by discontinuing it. By utilizing appropriate frequency-selective, light-responsive means, automatic modification or discontinuation of the process which alters the thickness of the body may also be provided in response to the above-mentioned indications.

In a preferred embodiment of the invention described in detail hereinafter, a semiconductive body of a material such as silicon is subjected to progressive dissolution by means of an etching solution preferably translucent to visible light. Light is applied to one side of the region subjected to etching, and the light transmitted through the thickness of the material then assumes successively different colors as the thickness is reduced through the range of approximately 0.6 to 0.1 mil. For example, I have found that when the material has been reduced to a thickness of about 0.6 mil, there will first be observed a distinct reddish glow of transmitted light, which then changes successively to orange, yellow and white in that order as the thickness is further reduced. I have also found that definite values of thickness may be positively ascribed to the dominant wavelengths of the transmitted light, and that by observing the color of the transmitted light and terminating etching when a predetermined color is produced, one may accurately provide regions in the semiconductive material of predetermined, very small thicknesses.

To provide such bodies automatically, one may employ a plurality of frequency-selective photo-responsive devices subjected to the transmitted radiation and having their peak responses for different colors in the transmitted spectrum, at least one photo-responsive device peaking at a frequency for which the transmittance of the semiconductor is changing rapidly for thicknesses at or near that thickness at which etching is to be discontinued. An appropriate sensitive relay actuated by the differential output signals of the photo-responsive devices may then be utilized to discontinue the etching either by removing the semiconductive body from contact with the etchant or, when the etching is of electrolytic nature, by discontinuing the etching current.

With this method, semiconductive bodies of a large variety of original thicknesses may simply and reliably be modified so as to provide a thin region of uniform thickness, either with the aid of manual actuation or completely automatically. Because the method utilizes changes in spectral distribution as an indication of thickness, it does not require accurate control of the source intensity, and attainment of the desired thickness is readily detected. By using a translucent etchant of neutral density continuous measurement of thickness is provided without requiring interruption of the thickness-modifying process.

Other objects and features of the invention will be more readily understood from a consideration of the following detailed description in connection with the accompanying drawings, in which.

Figure 1:
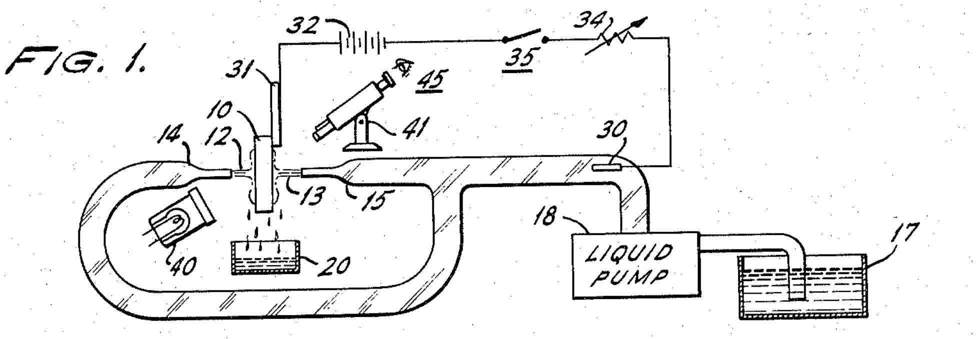
Figure 1 is a diagrammatic representation of one form of apparatus for practising the method of my invention.

Considering the invention now in more detail, in Figure 1 there is represented schematically an arrangement for electrolytically jet-etching a wafer of silicon to a predetermined relatively small thickness, and for terminating the etching action when the desired, preselected thickness has been achieved. Since the jet-etching apparatus itself has been described in detail in the above-mentioned copending applications, it will be necessary here to indicate in detail only those modifications of the system which are suitable in connection with the present invention.

In using the arrangement of Figure 1 to produce semiconductive bodies suitable for use in high-frequency transistors, the wafer 10 may suitably be of P-type single-crystalline silicon approximately 3 mils in original thickness, having a resistivity of the order of 15 ohm-centimeters, a minority-carrier lifetime of the order of 20 microseconds and a 1,1,0 crystal orientation. However, it will be understood that the method is applicable to wafers of widely different characteristics, and the above-mentioned values are by way of example only. Wafer 10 is subjected to impingement by a pair of electrolytic jets 12 and 13, preferably directed against precisely opposite points on the wafer surface. These jets are formed by nozzles 14 and 15 respectively, and supplied with electrolyte under pressure from reservoir 17 by way of liquid pump 18 and associated tubing. A receptacle 20 may suitably be provided to catch and retain the electrolyte after impingement upon wafer 10.

Electrolytic current is applied between wafer 10 and the jets of electrolyte by way of inert electrode 30, immersed in the electrolyte at the point shown, and ohmic connector 31 soldered or otherwise appropriately affixed to wafer 10. Electrodes 30 and 31 are supplied with a suitable etching potential from potential source 32, by way of variable resistor 34 and manually-operable switch 35, which is closed during the etching operation.

A source 40 of illumination is directed against the surface impinged by jet 12, and a microscope 41 is preferably positioned to provide ready viewing of any light from source 40 which passes through the region of wafer 10 under jet 13. Preferably but not necessarily an appropriate light shield (not shown) may be disposed about wafer 10 to prevent light other than that traversing wafer 10 from reaching the eye of a viewer at position 45. Light source 40 in the present instance may typically comprise an ordinary microscope lamp utilizing an 18 watt bulb to cast substantially white light upon the surface of wafer 10 beneath jet 12.

When the wafer 10 is of silicon and intended for use in a high-frequency transistor for example, the electrolyte may suitably comprise a 0.4 normal solution of sodium fluoride, the jets 12 and 13 may typically have a diameter of about 8 mils, and the liquid pressure is preferably adjusted to provide sharply defined streams and a smooth flow of electrolyte along wafer 10 after impingement. The light source 40 is connected to an appropriate power source (not shown) and directed so as to illuminate the surface impinged by jet 12 when wafer 10 is placed in the etching position. Immediately prior to placing wafer 10 in the position shown, the silicon wafer is preferably dipped into a suitable chemical etch to remove any oxide layers which may have formed on its surface. Next, with the wafer in the position shown, the variable resistance 34 is adjusted, with switch 35 closed, to provide about a 5 milliampere current and electrolytic etching begins from both sides of the wafer.

As etching progresses, any light transmitted through wafer 10 is observed at position 45. Starting with a silicon wafer of about 3 mils thickness, ordinarily there will be substantially no visible illumination transmitted through the wafer upon the initiation of the etching process. However, when the thickness of the material remaining between the two jets is reduced to about 0.6 mils, a red glow appears on the side of the etched surface opposite light source 40. As etching proceeds further, this red becomes more distinct and intense, then gradually fades first to an orange color, then to a yellow color, and, particularly if the etching is slowed at this point as by adjusting resistor 34, a nearly white color may also be observed before perforation occurs. I have found that the apparent color of the transmitted light may be calibrated in terms of the thickness of the remaining silicon, the following tabulation indicating the general correspondence:

| | |
|---|---|
| Red | 0.6 to 0.35 mil |
| Orange | 0.35 to 0.2 mil |
| Yellow | 0.2 to 0.1 mil |
| White | Less than 0.1 mil |

It will be understood that the transitions in color from red-to-orange to yellow-to-white are actually continuous, and that the transmitted light has a different and unique color for each thickness of the wafer 10. The continuity of this relationship is indicated by the continuous curve of Figure 2, wherein ordinates represent thicknesses of the wafer in microns while abscissae represent the dominant wavelengths of the corresponding colors of transmitted light. From this curve it will be appreciated that any thickness in the range shown may be produced by discontinuing etching when the corresponding unique color appears. For example, to produce a region of silicon having a thickness of 0.15 mils, the color of the transmitted light is observed during etching, and the switch 35 manually opened and wafer 10 removed to discontinue the etching when the transmitted light assumes a yellow color. If an untrained operator is to utilize the equipment, it will sometimes be convenient to provide the operator with an object having the color at which etching is to be stopped, so that only a simple color-matching comparison is necessary to determine the existence of the desired thickness.

While in the particular application of the invention just described the step performed upon the occurrence of the selected thickness is ordinarily to terminate further etching, the invention also contemplates that other modifications of the etching process may be performed at this time instead. For example, the occurrence of a preselected color corresponding to a known material thickness may be utilized as an indication of a suitable time at which to slow down the rate of etching, thereby permitting rapid etching at the beginning of the process when thickness is non-critical and slow etching in the interest of improved accuracy as the desired critically-thin configuration is approached. Such slowing of etching may be produced by adjustment of resistor 34. In other applications it will be advantageous to move the jets to another position, to change their shape, area or pressure, or to switch to other jets when preselected thicknesses are produced.

Figures 2, 3, 4:
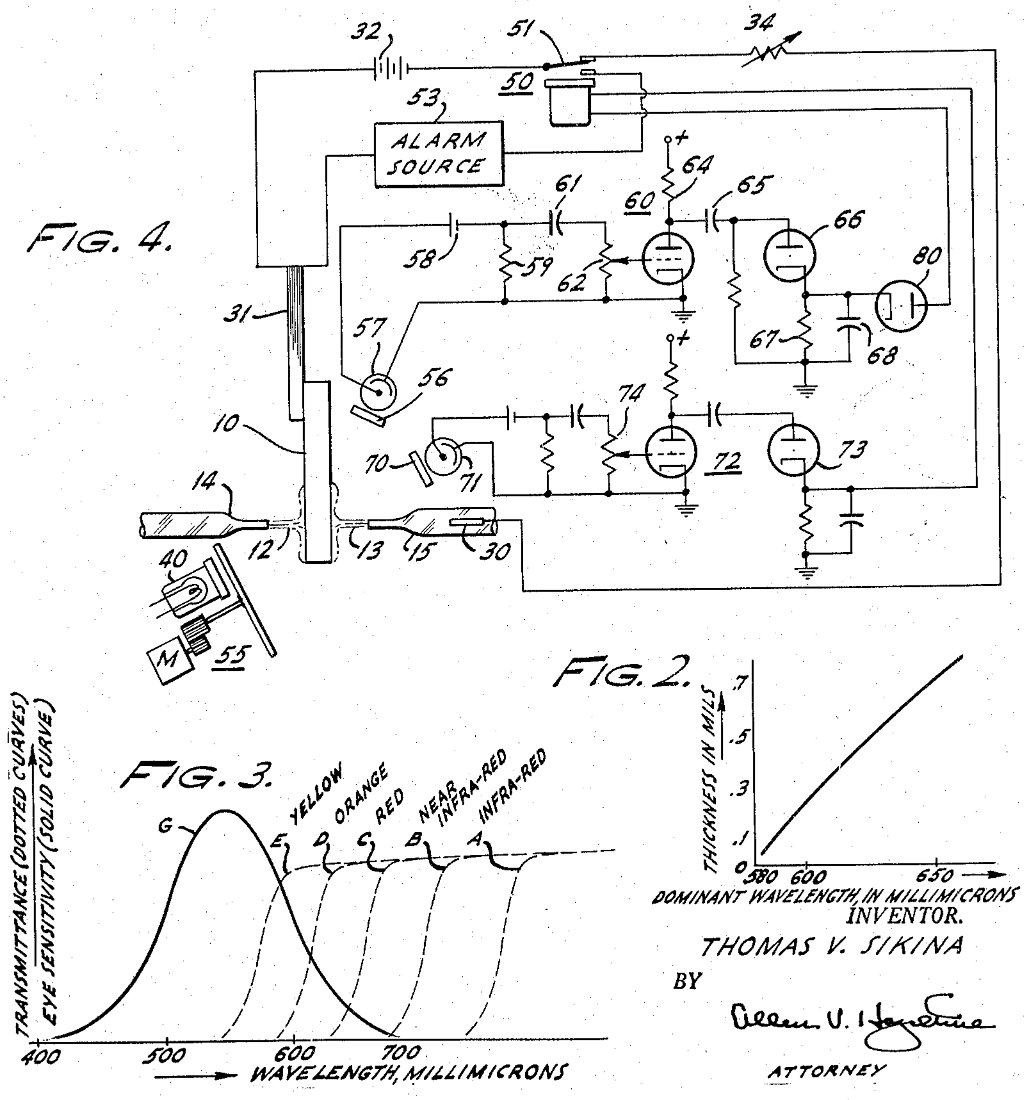
Figure 2 is a graphical representation to which reference will be made in describing certain uses of the invention.
Figure 3 is another graphical representation to which reference will be made in describing my theory of the invention.
Figure 4 is a diagrammatic representation, partly schematic and partly in block form, illustrating automatic apparatus in accordance with one aspect of the invention.

Although I do not wish to be limited by any specific details of the theory of my invention, I believe the mechanism of its operation to be explained by the following considerations, which will be more readily comprehended from a consideration of Figure 3. In Figure 3, curves A, B, C, D and E represent graphs of the lower edge of the optical passband of the silicon wafer for electromagnetic radiations. Thus, each of these curves is a plot of transmittance versue wavelength of incident illumination, for various thicknesses of the wafer. It will be understood that these representations are for explanatory purposes only, and the exact form of the curves is not intended to be quantitatively representative of the spectral distributions existing in any particular application. What it is intended to show by this figure is that the lower edge of the optical passband of the wafer extends farther and farther into the short-wavelength region as the wafer is made thinner, and that the distribution of the transmitted spectral components is thereby modified to contain larger and larger amounts of those components for which the eye has greater sensitivity, as shown by the eye-sensitivity curve G.

For example, curve A represents the lower edge of the optical passband of wafer 10 upon the initiation of etching, at which time the wafer thickness is 3 mils. It is seen that at this time no substantial transmittance exists for spectral components in the visible spectrum of 400 to 700 millimicrons, transmittance being limited to the infra-red and longer wavelengths. Curve B represents the lower edge of the passband for a thickness of about 1 mil, for which case there begins to be appreciable transmittance for red light, although the transmittance is so light that, when combined with the relatively low sensitivity of the eye for red, the light appears dim to the viewer. However, as shown by curve C, when the thickness is reduced to 0.5 mil the transmittance for red becomes large, and a bright red glow is observed. For curve D, corresponding to a 0.3 mil thickness, not only red but also orange light is transmitted by the silicon and, since the response of the eye to orange is substantially greater than to red, the resultant color is predominantly orange. As shown by curve E, at 0.15 mil thickness the spectral distribution of the transmitted light has changed so that the lower edge of the transmitted band now includes yellow and, since the eye response is greater for yellow than for orange or red, the resultant color is predominantly yellow. As the thickness is further reduced, even more of the visible spectrum is included in the transmitted light, which therefore shifts from yellow to a color so desaturated as to be substantially white at about 0.05 mil thickness.

From the foregoing it will therefore be apparent that the spectral passband of the silicon wafer is characterized by a sloping skirt at its high-frequency end which varies its position within the visible band as the wafer thickness varies in the vicinity of the desired value. Therefore the spectral distribution of the light transmitted by the wafer changes substantially as the thickness is varied in this range; for example while for a 0.5 mil thickness the transmitted red light is of many times greater magnitude than the transmitted yellow light, when the thickness is 0.15 mil the yellow light is nearly equal to the red light in magnitude. Since this change in spectral distribution occurs in the visible range, it appears as a shift in the color of the transmitted light.

The nature of the spectral passbands of a semiconductive material for given thicknesses depends in large measure on the nature of the material, and whether or not it transmits appreciably in the visible band depends in large measure upon the magnitude of the energy-gap for current carriers in the material. The higher the gap, the higher the frequencies which will be passed without great absorption. For example, the energy gap for pure silicon is about 1.2 electron volts, which is sufficiently large that frequencies as high as the visible spectrum are transmitted for thicknesses of about 0.2 mil. For germanium, the energy-gap is about 0.6 electron volts, and substantially no visible light is transmitted at 0.2 mil thickness. Only when the germanium is less than about 0.05 mil thick is there an appreciable transmission of deep red. For materials having energy-gaps intermediate germanium and silicon, or slightly higher than silicon, the lower edge of the spectral passband of the material will also lie in the visible part of the electromagnetic spectrum for material thicknesses in the range of interest for transistor use. Uniform single-crystalline mixtures of germanium and silicon possess such intermediate values of energy gap as do certain of the intermetallic compounds such as gallium antimonide.

However, even when the material utilized does not provide substantial amounts of visible light in the radiation transmitted thereby, the invention may still be practiced in another form thereof by utilizing suitable photo-responsive devices to detect changes in the spectral distribution of transmitted light at frequencies beyond the visible range. Such photo-responsive devices may also be utilized to provide an automatic control system whether the transmitted radiation of interest lies within or without the visible band, as shown in Figure 4.

Referring now to Figure 4 in detail, wherein like numerals denote like parts, the arrangement shown therein is operative to provide an automatic indication of when a predetermined thickness of semiconductive material has been produced by electrolytic etching, and to modify the etching operation automatically at such time. As in the system of Figure 1 the jets of electrolyte 12 and 13 are directed against opposite surfaces of semiconductive wafer 10 and etching potential is supplied from potential source 32 to inert electrode 30 and base tab 31 by way of a current-controlling variable resistor 34 and a series-arranged switching device. Light source 40 again provides illumination of the region of wafer 10 under jet 12.

However, the arrangement of Figure 4 differs from that of Figure 1 in the following principal ways. First, in Figure 4 the manually-operable single-pole, single-throw switch of Figure 1 is replaced by a single-pole, double-throw relay-operated switch 50, arranged so that when relay 50 is de-energized switch arm 51 is in its upward position in which etching current is passed to the electrolytic jets 12 and 13. On the other hand, when relay 50 is energized by current through its magnetic coil, switch arm 51 is moved to its downward position in which potential source 32 is disconnected from jets 12 and 13 and instead is connected across alarm device 53, which may be an audible or visual indicator such as a flashing light or bell for example. Therefore, upon the passage of current through the actuating coil of relay 50, electrolytic etching is terminated and an alarm given.

Secondly, Figure 4 is provided with photoresponsive means to be described in detail hereinafter, for producing a current through the actuating coil of relay 50 upon the occurrence of a predetermined change in the spectral distribution of the light transmitted through wafer 10. To facilitate the detection of the desired spectral distribution, there is preferably provided also a conventional light-chopper 55 comprising a rotatable, apertured disc of material opaque to light from source 40 and coupled by suitable mechanical means to a motor for rotating the disc between source 40 and wafer 10 so as to provide intermittent illumination of the wafer. A suitable frequency of interruption of the light is 1,000 C. P. S.

The form of the apparatus shown for detecting changes in spectral distribution of the transmitted light is by way of example only, in this case comprising generally first spectrally-selective means for deriving a first signal indicative of the strength of the red component of the transmitted light, second spectrally-selective means for deriving a second signal indicative of the strength of the orange component of the transmitted light, and signal-comparing means for supplying energizing current to relay 50 when the two signals are substantially in a predetermined ratio to each other. More particularly, the apparatus for deriving a signal indicative of the red component of the transmitted light may comprise a narrow-band light filter 56 of conventional type passing substantially only red light of about 650 millimicrons wavelength, which is then caused to fall upon photo-cell 57, the cathode of which is held negative with respect to the anode thereof by means of battery 58. An appropriate load resistor 59 is connected in series with battery 58 and cell 57. When the thickness of wafer 10 is sufficiently small, pulses of red light from source 40 will pass through wafer 10 and filter 56 to photocell 57, producing corresponding pulses of voltage across load resistor 59. The strength of these voltage pulses is therefore indicative of the strength of the red component in the transmitted light from source 40.

The voltage pulses across resistor 59 are supplied to the grid of an amplifying stage 60 in negative polarity, by way of coupling capacitor 61 and adjustable voltage-divider 62, which permits adjustment of the over-all gain of the red-light detecting channel. Stage 60 may comprise a conventional triode amplifier having a plate load resistor 64, across which the amplified pulses are developed in positive polarity. These positive pulses are then supplied through coupling capacitor 65 to a conventional peak-detector circuit comprising a diode 66 and a cathode load made up of resistor 67 and capacitor 68 in parallel, the time constant of this cathode load circuit preferably being long compared to the interval between applied pulses. The voltage at the cathode of diode 66 therefore comprises a positive voltage having a value substantially proportional to the strength of the red component of the transmitted light, and controllable by means of the voltage divider 62.

The apparatus for deriving a signal indicative of the strength of the orange component of transmitted light need not be described in detail since it may be substantially identical to that just described for the red-signal channel, except that filter 70 passes substantially only orange light of about 600 millimicrons wavelength rather than red light. The pulses of orange light from filter 70 are detected by photo-cell 71, and the resultant voltage pulses amplified in triode stage 72 and converted to a continuous voltage by peak-detector diode 73. Adjustable voltage-divider 74 permits adjustment of the over-all gain of the orange signal channel.

The cathode of diode 73 is connected directly to one end of the energizing coil of relay 50, while the cathode of diode 66 is connected to the other end of the energizing coil by way of series diode 80. Diode 80 is arranged with its cathode connected to the cathode of diode 66, thereby permitting current flow through the energizing coil only when the voltage at the cathode of diode 73 exceeds that at the cathode of diode 66, i. e. when the amplitude of the orange-indicating signal exceeds that of the red-indicating signal.

The operation of the arrangement of Figure 4 is then as follows. With switch arm 51 in its upper position and light source 40 providing strong illumination of wafer 10 by way of light-chopper 55, electrolytic etching is begun. With silicon wafers of usual original dimension, there are at first substantially no red or orange components in the transmitted light, and therefore no indicating voltages at the cathodes of diodes 66 and 73. However, as etching is continued and a wafer thickness of about 0.6 mil approached, spectral components of the frequencies passed by red filter 56 begin to appear in the transmitted light in substantial magnitudes, and a voltage indicative of the strength of the transmitted red light is built up at the cathode of diode 66. However, due to the polarity of the diode 80, this voltage is not aplied to the energizing coil of the relay 50. Etching therefore continues until the thickness of wafer 10 is reduced to the point where substantial amounts of orange light appear in the transmitted radiation, pass through filter 70, and produce a corresponding increase in the voltage at the cathode of diode 73. Depending upon the settings of gain-controls 62 and 74, the orange-indicating voltage may be caused to rise above the red-indicating voltage for a preselected value of wafer thickness. When this occurs, diode 80 conducts, relay 50 is energized, switch arm 51 moves to its lower position, electrolytic etching is thereby discontinued, and alarm device 53 actuated to indicate that wafer 10 may now be removed. If desired, alarm device 53 may obviously be replaced with an appropriate solenoid mechanism for automatically moving wafer 10 out of its position between the jets.

In setting the gain controls 62 and 74, in the case of silicon it will ordinarily be necessary to provide an overall gain for the orange channel, including the optical and photo-responsive portions thereof, which is greater than that for the red channel. Otherwise, as indicated by Figure 3, the orange-indicating signal may never rise above the red-indicating signal and termination of etching will not occur. With an orange-channel gain only slightly greater than that for the red channel, termination will be produced only when the steep, short-wavelength skirt of the optical passband of the silicon has moved substantially completely past the wavelength of the orange light passed by filter 70. However, if the gain of the orange channel is made large compared to that of the red channel, termination will occur for slightly greater thicknesses of material.

The automatic arrangement of Figure 4 also has the advantage that it may be employed with transmitted radiations lying outside the visible spectrum. Thus the above-described operation of the apparatus shown in Figure 4 may make use of electromagnetic radiations partly or entirely beyond the range to which the human eye responds, so long as filters 56 and 70 are modified to pass light of the required frequencies and the responses of the photocells employed are adequate at the frequencies selected. This fact permits substantially greater freedom of choice as to the nature and thicknesses of the materials to which the method is applied.

It will also be understood that previously-described alternative ways in which the etching procedure may be modified upon the occurrence of the preselected thickness are also applicable to the automatic system of Figure 4. Thus the signals produced by the photo-responsive light-measuring apparatus of Figure 4 may be utilized to actuate any suitable mechanical apparatus for slowing the etching action, changing the position, shape, area, pressure or nature of the jets or for other purposes.

While it has been convenient to describe the invention with particular relation to specific embodiments thereof, it will be understood that it may be embodied in a variety of other forms without departing from the spirit thereof. For example, the etching procedure utilized to reduce the dimensions of the semiconductor need not employ electrolytic jets but may in some instances employ jets of a chemical etchant without applied current; alternatively, bath etching of either the electrolytic or chemical type may be employed. Furthermore the thickness-modifying procedure need not be in the direction of reducing the thickness, but may instead involve increasing the thickness to the desired value, as may be the case for example in building up evaporated or electroplated deposits of semiconductor to a desired critical thickness. In addition, the method may be employed in applications in which the thickness of the observed, illuminated region is varied by varying the position of the observed region upon a body of non-uniform thickness. For example, a light source, suitably coordinated with an electroplating jet, may be caused to scan a body of non-uniform thickness until transmitted radiations indicative of the desired thickness are obtained, at which time the plating jet may be activated to deposit metallic elements suitable for ultimate use as emitter and collector of a transistor.

I claim:

1. The method of controlling the thickness of a semiconductive body comprising the steps of progressively and continuously altering the thickness of at least a region of said body, applying to said region light radiation containing spectral components for which said material has substantially different transmittance for at least some thicknesses produced during said altering step, providing indications of the relative strengths of at least some of those spectral components transmitted by said region of said body, and modifying said altering of said thickness upon the occurrence of a change in said indications.

2. The method of claim 1, in which said altering of the thickness of said region comprises progressively reducing said thickness.

3. The method of claim 1, in which said altering of the thickness of said region is effected by etching said body.

4. The method of claim 3, in which said etching comprises electrolytic etching.

5. The method of claim 3, in which said etching is effected by applying a translucent etchant to said body.

6. The method of claim 3, in which said etching is effected by directing a jet of etchant against said body.

7. The method of claim 1, in which said applied radiation includes components in the visible spectrum.

8. The method of claim 1, in which said modifying step comprises discontinuing said altering of said thickness.

9. The method of controlling the treatment of a semiconductive structure comprising the steps of progressively and continuously varying the thickness of a semiconductive body, transmitting light radiation through said body, deriving indications of changes in the shape of the spectral distribution curve of the transmitted radiation, and modifying the treatment of said body upon the occurrence of changes in said shape of said spectral distribution curve.

10. The method of providing a semiconductive body of accurately-controlled thickness, comprising the steps of etching said body to reduce the thickness thereof, applying visible light to said body, deriving indications of the color of the portion of said light which is transmitted by said body, and modifying said etching process upon the occurrence of a particular color of said transmitted light.

11. The method of claim 10 in which said etching and said application of light to said body are performed simultaneously.

12. The method of claim 11, in which said etching is terminated upon the occurrence of said particular color.

13. The method of shaping a semiconductive body comprising the steps of progressively and continuously modifying the thickness of said body, transmitting light radiation through said body, deriving signals indicative of changes in the relative strengths of different spectral components of said transmitted light, and altering the nature of said thickness-modifying steps in response to said derived signals.

14. The method of claim 13, in which said signal-deriving step comprises deriving a plurality of signals representative of the respective intensities of different groups of spectral components of said transmitted radiation, and comparing the strengths of said signals.

15. A method for determining the existence of a region of predetermined thickness in at least a portion of a body of semiconductive material, comprising the steps of applying to one surface of said body portion light radiations containing a band of spectrum components for which said material has substantially different transmittances for different thicknesses in the vicinity of said thickness, and deriving indications of the relative strengths of at least some of those of said spectrum components which are passed by said body portion.

16. The method of producing a body of semiconductive silicon material of controlled thickness, comprising the steps of jet-electrolytically etching at least a portion of said body, applying visible light to one side of said body portion, sensing the color of light transmitted by said body portion, and discontinuing said etching upon the occurrence of a particular color of the light transmitted by said body.

17. Apparatus for producing a body of semiconductive material of controlled thickness, comprising means for etching a body of said material to reduce at least one dimension of a portion thereof, a source of light radiations, photo-responsive means spaced from said source by a distance sufficient to accommodate said body and disposed so as to be irradiated by light radiations from said source, said photoresponsive means being responsive to said radiations to derive indications of the strengths of a first group of spectral components of said radiations relative to the strengths of a second group of spectral components thereof, and means for controlling said etching means in response to said derived signals.

18. Apparatus in accordance with claim 17, in which said photo-responsive means comprises apparatus for deriving a plurality of signals indicative of the intensities of different groups of spectral components of said light radiations incident thereon, and in which said etch-controlling means comprises a device responsive to said plurality of signals to discontinue said etching.

References Cited in the file of this patent

UNITED STATES PATENTS

| | | |
|---|---|---|
| 1,882,962 | Sawford | Oct. 18, 1932 |
| 2,044,131 | Staege | June 16, 1936 |
| 2,361,217 | Lewis | Oct. 24, 1944 |
| 2,472,605 | McRae et al. | June 7, 1949 |
| 2,644,852 | Dunlap | July 7, 1953 |
| 2,767,137 | Evers | Oct. 16, 1956 |